United States Patent [19]
Martin

[11] Patent Number: 5,652,694
[45] Date of Patent: Jul. 29, 1997

[54] FRICTION HINGE INCLUDING COMPRESSED FRICTION WASHER

[75] Inventor: Michael M. Martin, Seal Beach, Calif.

[73] Assignee: Canon Business Machines, Inc., Costa Mesa, Calif.

[21] Appl. No.: 595,164

[22] Filed: Feb. 1, 1996

[51] Int. Cl.⁶ .............. G06F 1/16; E05D 11/08; H05K 7/02
[52] U.S. Cl. .............. 361/681; 16/223; 16/342
[58] Field of Search .............. 439/31, 165; 16/337–339, 16/341, 342, 223; 248/183.3, 917–923; 364/708.1; 361/681, 682

[56] References Cited

U.S. PATENT DOCUMENTS

| | | | |
|---|---|---|---|
| 4,630,332 | 12/1986 | Bisbing | 16/273 |
| 4,730,364 | 3/1988 | Tat-Kee | 16/337 |
| 4,781,422 | 11/1988 | Kimble | 312/7.2 |
| 5,001,659 | 3/1991 | Watabe | 16/223 X |
| 5,111,361 | 5/1992 | Kobayashi | 361/683 |
| 5,173,837 | 12/1992 | Blackwell et al. | 361/681 |
| 5,195,213 | 3/1993 | Ohgami et al. | 16/342 |
| 5,231,734 | 8/1993 | Rude | 16/342 |
| 5,335,142 | 8/1994 | Anderson | 361/681 |
| 5,363,089 | 11/1994 | Goldenberg | 340/825.44 |
| 5,390,075 | 2/1995 | English et al. | 361/683 |

Primary Examiner—Michael W. Phillips
Attorney, Agent, or Firm—Fitzpatrick, Cella, Harper & Scinto

[57] ABSTRACT

A hinge fastens a display screen to a keyboard base, and uses a frictional force generated by one or more compressed friction washers to control angular motion of the display screen with respect to the keyboard base. The hinge includes two shoulders defining inwardly-facing flat abutment surfaces separated by a first distance, the two shoulders being disposed on the keyboard base, and a knuckle having a pair of outwardly-facing flat abutment surfaces separated by a second distance which is less than the first distance, the knuckle being disposed on the display screen. Also included in the hinge is at least one compressible friction washer, disposed between the knuckle and the two shoulders, and having a thickness which is greater than a difference between the first distance and the second distance, but which is compressible to less than the difference. Each of the two shoulders, the knuckle, and the at least one compressible friction washer has an alignable throughbore. A pin fits through the alignable throughbores of the two shoulders, the knuckle, and the at least one compressible friction washer.

22 Claims, 12 Drawing Sheets

FRICTION HINGE INCLUDING COMPRESSED FRICTION WASHER

BACKGROUND OF THE INVENTION

1. Field of the Invention

The present invention relates to a hinge for a laptop computer, and the like, which controls angular motion of a display screen with respect to a keyboard base using a frictional force created by an interference fit among compressible elastic washers, the display screen, and the keyboard base.

2. Description of the Related Art

As is generally known, laptop computers include a display screen attached to a keyboard base via a hinge. Examples of such hinges are hinges 1, shown in FIG. 1A, which, for laptop computer 2, attach display screen 3 to keyboard base 4. Such hinges are designed both to permit angular motion of the display screen with respect to the keyboard base, and to maintain the display screen at an angle with respect to the keyboard base absent an applied force.

Conventional hinges for laptop computers and the like are complex in structure, and thus costly to manufacture. For example, some such hinges, such as constant torque hinges, rely on tension created by a band or spring wrapped around a shaft to control angular motion of a display screen. While such arrangements can be effective, as noted, due to their complexity, they are both difficult and costly to manufacture.

Friction hinges, which control angular motion of a display screen with respect to a keyboard base by using friction between portions of the display screen and the keyboard base, are also generally known in the art. Heretofore, however, such friction hinges have relied upon complex mechanisms and arrangements to generate a necessary frictional force.

In this regard, conventional friction hinges most commonly rely upon screws or bolts to generate a frictional force among washers, portions of a keyboard base and a display screen. In such hinges, the frictional force is created by tightening the screw to increase pressure on the washers. While such conventional friction hinges can be effective, they suffer from the same drawbacks as the constant torque hinges described above. That is, conventional friction hinges are both mechanically complex and costly. In addition, conventional friction hinges oftentimes require adjustment at some point during their lifetime due to a loosening of the screw or to general wear.

Thus, there exists a need for a hinge which controls angular motion of a display screen with respect to a keyboard base, which can maintain the display screen at a fixed angle with respect to the keyboard base, and which is both structurally simple and inexpensive to manufacture.

SUMMARY OF THE INVENTION

The present invention addresses the foregoing need by providing a friction hinge which controls angular motion of a display screen with respect to a keyboard base by using a frictional force created by compressing friction washers to fit between a knuckle which protrudes from the display screen and two shoulders on the keyboard base.

More specifically, according to one aspect, the present invention is a hinge for fastening a display screen to a keyboard base, which uses a frictional force generated by one or more compressed friction washers to control angular motion of the display screen with respect to the keyboard base. The hinge includes two shoulders defining inwardly-facing flat abutment surfaces separated by a first distance, the two shoulders being disposed on the keyboard base, and a knuckle having a pair of outwardly-facing flat abutment surfaces separated by a second distance which is less than the first distance, the knuckle being disposed on the display screen. Also included in the hinge is at least one compressible friction washer, disposed between the knuckle and the two shoulders, and having a thickness which is greater than a difference between the first distance and the second distance, but which is compressible to less than the difference. Each of the two shoulders, the knuckle, and the at least one compressible friction washer has an alignable throughbore. A pin fits through the alignable throughbores of the two shoulders, the knuckle, and the at least one compressible friction washer.

By virtue of the foregoing arrangement, it is possible to control angular motion of a display screen with respect to a keyboard base using a mechanical arrangement which is both simple and inexpensive to manufacture, and which requires few adjustments during its lifetime. More specifically, because the frictional force is generated by compressing at least one friction washer between a knuckle and two shoulders, all of which have fixed dimensions, the need for additional mechanisms to generate the frictional force is reduced.

In a preferred modification to the aspect of the invention described above, the inwardly-facing flat abutment surfaces of the two shoulders are angled away from each other such that a distance between the inwardly-facing flat abutment surfaces is at a minimum at the keyboard base. The pair of outwardly-facing flat abutment surfaces of the knuckle are angled toward each other such that a distance between the outwardly-facing flat abutment surfaces is at a maximum at the display screen.

Advantageously, the foregoing configuration generates a frictional force which varies in accordance with the angle of the display screen relative to the keyboard base. More specifically, when the display screen is at a 90° angle with respect to the keyboard base, the surfaces of the shoulders and those of the knuckle are substantially parallel. However, as the display screen is rotated away from this 90° angle, the widest portion of the knuckle, i.e., that portion closest to the display screen, approaches the narrowest portion of the distance between the surfaces of the two shoulders, i.e., at the keyboard base. As a result, the friction washer is even further compressed, thereby increasing the frictional force generated by the friction hinge.

In another preferred modification to the aspect of the invention described above, the knuckle is comprised of an upper portion and a lower portion, the upper portion and the lower portion having alignable throughbores. The upper portion of the knuckle is mated to the lower portion of the knuckle such that the throughbore of the upper portion is aligned to the throughbore of the lower portion. The pin is run through the throughbore of the upper portion and the throughbore of the lower portion.

The foregoing configuration reduces the need to preassemble the knuckle prior to assembling the friction hinge. That is, the mating portions of the knuckle can be mated upon assembly of the friction hinge, whereafter the pin can be used to hold the knuckle together in addition to holding the friction hinge together.

In still another preferred modification to the aspect of the invention described above, the two shoulders comprise a first shoulder and a second shoulder. The first shoulder has a channel which runs from the keyboard base to an inwardly-facing flat abutment surface of the first shoulder. An outwardly-facing flat abutment surface of the knuckle which faces the first shoulder includes a channel which runs through to the display screen. The channel of the first shoulder and the channel of the knuckle are aligned so that a continuous channel runs between the keyboard base and the display screen throughout an entire range of angular motion of the display screen with respect to the keyboard base.

The foregoing configuration can be used in a case where it is desired to run wires between the keyboard base and the display screen. More specifically, the wires can be run through the continuous channel, thereby reducing the need for additional wire conduits.

In another aspect, the present invention is a hinge for fastening a display screen to a keyboard base which uses a frictional force to permit controlled angular motion of the display screen with respect to the keyboard base, and to maintain the display screen at a set angle with respect to the keyboard base. The hinge includes two shoulders disposed on the keyboard base with a fixed distance therebetween, and a knuckle, disposed on the display screen and protruding therefrom, having a width which is smaller than the fixed distance, and positioned between the two shoulders such that a gap exists on each side of the knuckle between the knuckle and each of the two shoulders. Also included in the hinge are two friction washers made of a compressible elastic material, each of the two friction washers (1) having a thickness, in an uncompressed state, which is greater than that of the gaps between the knuckle and the two shoulders, and (2) being compressed to fit into one of the gaps between the knuckle and a shoulder, each of the two shoulders, the knuckle and the two friction washers having throughbores which are alignable. A pin connects the two shoulders, the knuckle and the two friction washers through their respective throughbores.

By virtue of the foregoing arrangement, angular motion of the display screen can be controlled using a simple mechanical arrangement. More specifically, because the frictional force is created using the fixed dimensions of the knuckle and the shoulders, rather than using complex mechanisms involving nuts and bolts, the simplicity of the invention is increased over that of its conventional counterparts. As a result, the cost of the invention is decreased.

According to still another aspect, the present invention is a hinge for fastening a display screen to a keyboard base which uses a frictional force to permit controlled angular motion of the display screen with respect to the keyboard base, and to maintain the display screen at a set angle with respect to the keyboard base. The hinge includes two shoulders disposed on the keyboard base with a fixed distance therebetween, and a knuckle, disposed on the display screen and protruding from the display screen, having a width smaller than the fixed distance, positioned between the two shoulders such that the knuckle abuts a first of the two shoulders and such that a gap exists between the knuckle and a second of the two shoulders, the knuckle having a throughbore. Also included in the hinge are a friction washer made of a compressible elastic material, which (1) has a thickness, in an uncompressed state, which is greater than that of the gap between the second shoulder and the knuckle, and (2) is compressed to fit into the gap between the second shoulder and the knuckle, the two shoulders, the knuckle and the friction washer having throughbores which are alignable, and a pin which connects the two shoulders, the knuckle and the friction washer through their respective throughbores. The first shoulder includes a channel which runs through to the keyboard base, and the knuckle, on a surface which faces the first shoulder, includes a channel which runs through to the display screen and which aligns to the channel on the first shoulder such that a continuous channel runs from the keyboard base to the display screen.

Accordingly, the foregoing configuration not only reduces the mechanical complexity, and thus the cost, of a hinge for controlling angular motion of a display screen with respect to a keyboard base, but also permits wires to be run between the keyboard base and the display screen through the hinge via the continuous channel.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

The present invention is a hinge which fastens a display screen to a keyboard base, and which uses a frictional force generated by one or more compressed friction washers to control angular motion of the display screen with respect to the keyboard base. The hinge includes two shoulders defining inwardly-facing flat abutment surfaces separated by a first distance, the two shoulders being disposed on the keyboard base, and a knuckle having a pair of outwardly-facing flat abutment surfaces separated by a second distance which is less than the first distance, the knuckle being disposed on the display screen. Also included in the hinge is at least one compressible friction washer, disposed between the knuckle and the two shoulders, and having a thickness which is greater than a difference between the first distance and the second distance, but which is compressible to less than the difference. Each of the two shoulders, the knuckle, and the at least one compressible friction washer has an alignable throughbore. A pin fits through the alignable throughbores of the two shoulders, the knuckle, and the at least one compressible friction washer.

First Embodiment

Figure 1A:
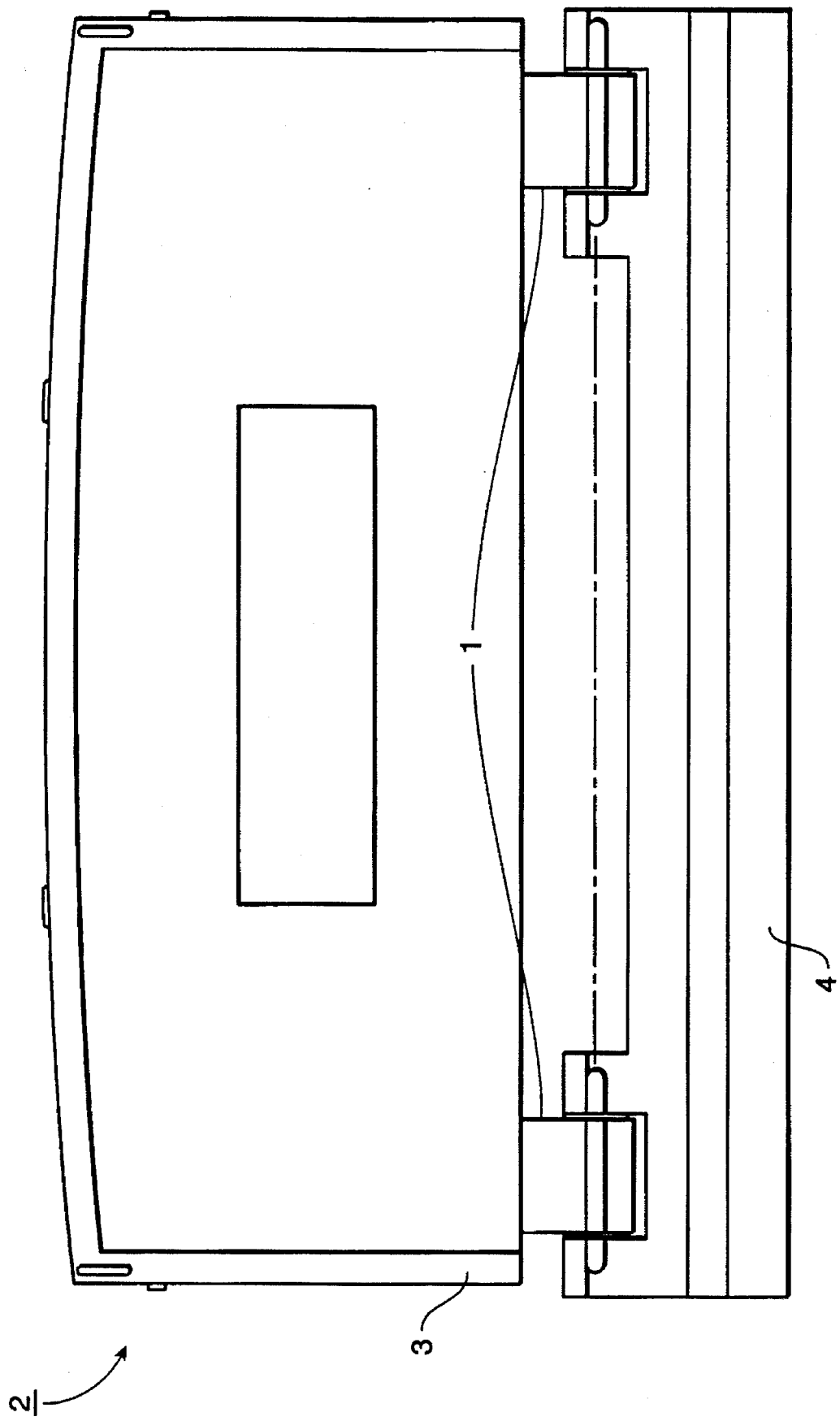
FIG. 1, comprised of FIGS. 1A and 1B, shows a laptop computer using friction hinges according to a first embodiment of the present invention.

FIG. 1A shows laptop computer 2 having hinges 1, which are hinges according to the first embodiment of the present invention. Hinges 1 attach display screen 3 to keyboard base 4, and permit angular motion of display screen 3 with respect to keyboard base 4, as shown. In this regard, it is noted that while FIG. 1A shows two hinges being used to attach display screen 3 to keyboard base 4, any number of such hinges can be used for this purpose.

Figure 1B:
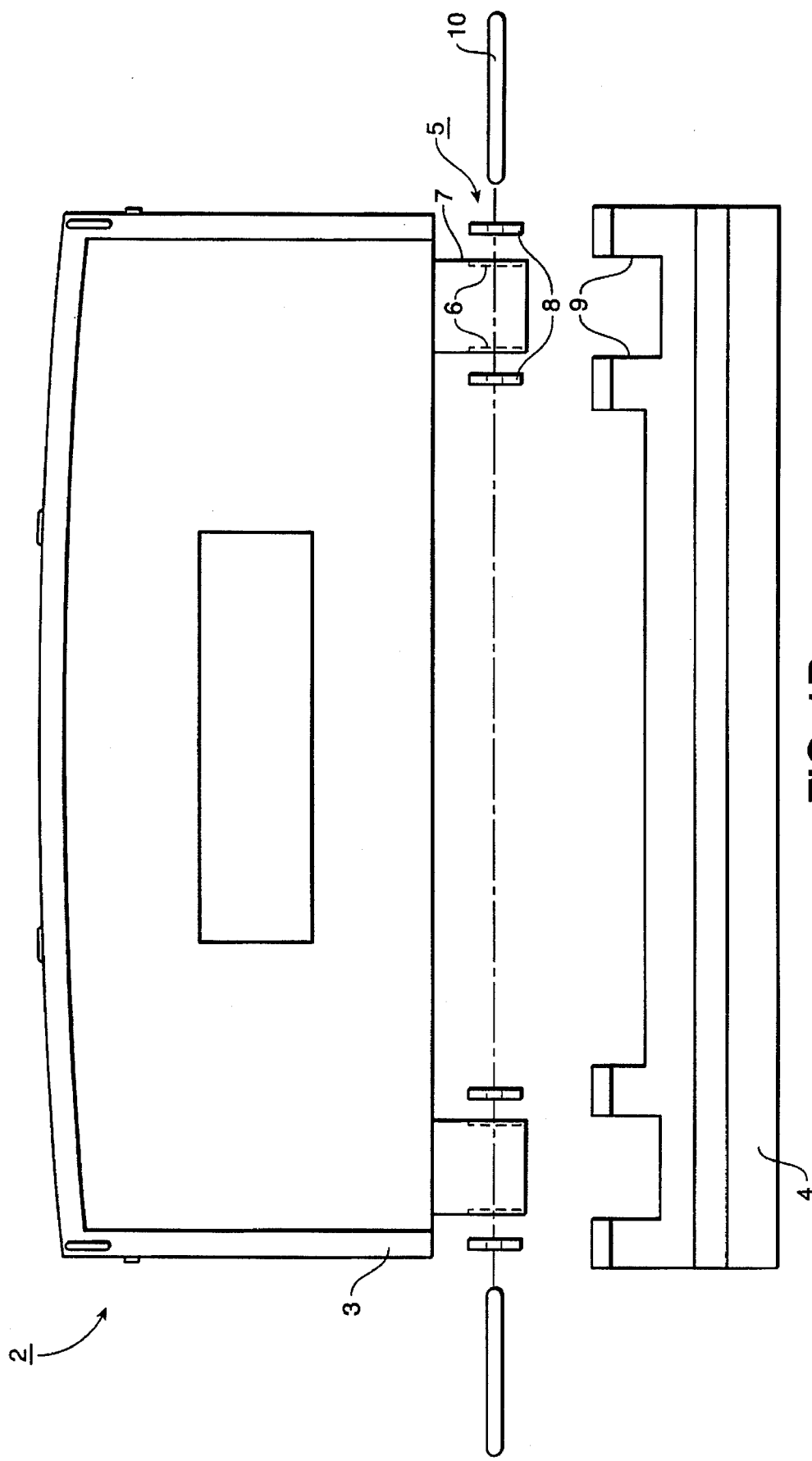
Figure 2:
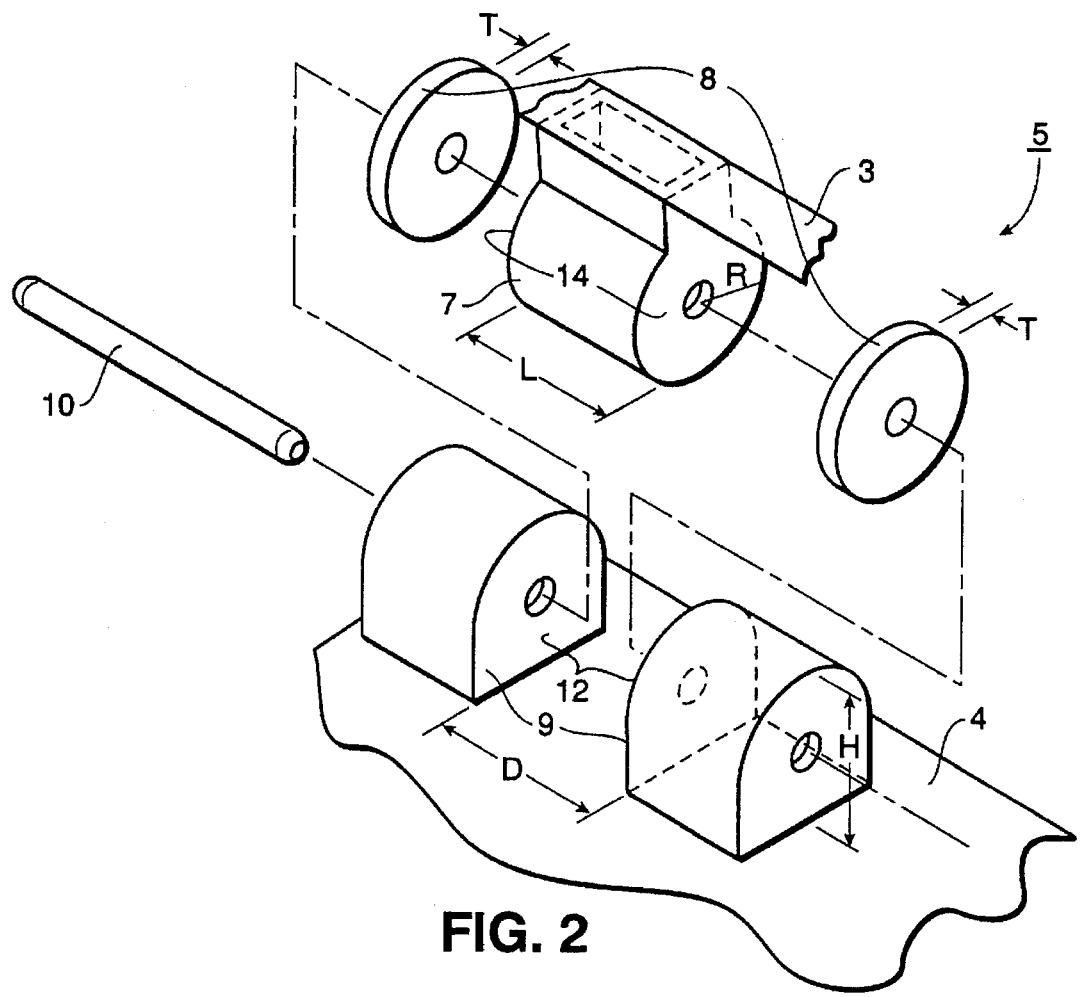
FIG. 2 shows a perspective view of a friction hinge according to the first embodiment of the present invention.

FIG. 2 shows a perspective view of hinge 5, shown in FIG. 1B, which is a first embodiment of the present invention. As shown in FIG. 2, hinge 5 includes knuckle 7, two friction washers 8, two shoulders 9, and pin 10, which are assembled as shown. A detailed description of each of these components is set forth below.

Shoulders 9, as shown in FIG. 2, are disposed on keyboard base 4 and can be either a part of keyboard base 4 or additional fixtures attached thereto. Shoulders 9 are separated from each other on keyboard base 4 by a fixed distance D which is not variable. Each of shoulders 9 has a rounded shape, and has a throughbore which aligns with that of the other shoulder. In addition, as shown, shoulders 9 define inwardly-facing abutment surfaces 12 which are flat and, in this embodiment, perpendicular to keyboard base 4.

Shoulders 9 can include recesses 6, shown by dashed lines in FIG. 1B. Each of recesses 6 preferably has a shape that corresponds to a shape of friction washers 8, and has a depth which does not interfere with friction washers 8 being compressed between knuckle 7 and shoulders 9. Recesses 6 are used primarily to keep friction washers 8 from sliding out of position during rotation of display screen 3 with respect to keyboard base 4.

Knuckle 7 is disposed on, and protrudes from, display screen 3, as also shown in FIG. 2. As was the case with respect to shoulders 9, knuckle 7 can be either a part of keyboard base 3 or an additional fixture attached thereto. As was also the case with shoulders 9, knuckle 7 has a rounded shape, and includes a throughbore, which can be aligned to the throughbores of shoulders 9. In addition, knuckle 7 defines outwardly-facing abutment surfaces 14 which are flat and substantially parallel to surfaces 12 of shoulders 9.

Knuckle 7 has a width W which defines a distance between outwardly-facing abutment surfaces 14, and which is less than the distance D between shoulders 9. As a result, knuckle 7 fits between shoulders 9. In this regard, as shown in FIG. 2, when hinge 5 is assembled, knuckle 7 is disposed between shoulders 9.

Figure 3:
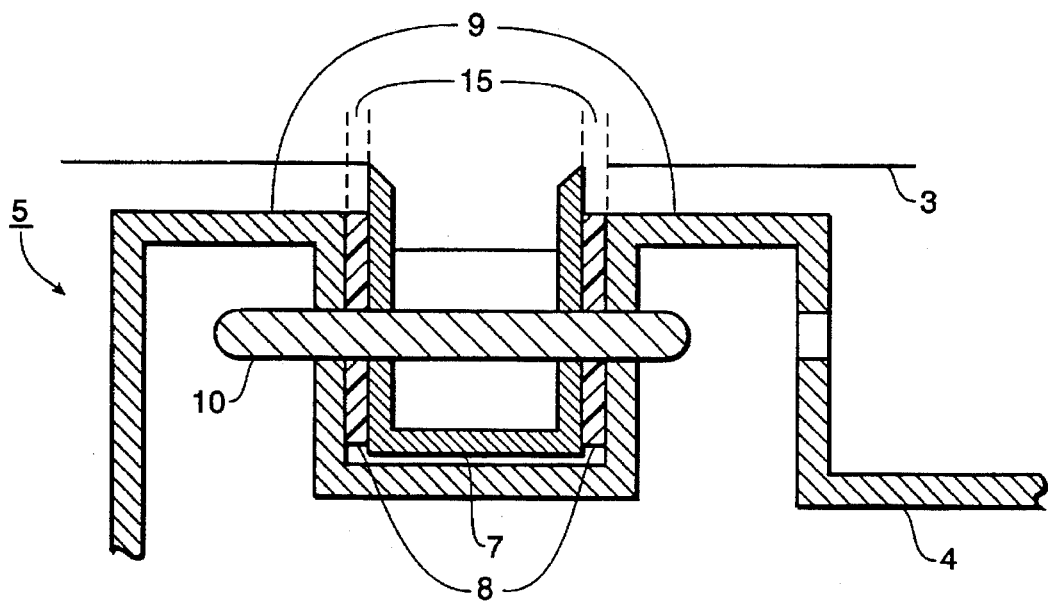
FIG. 3 shows a cross-sectional side view of the friction hinge according to the first embodiment of the present invention.

When knuckle 7 is disposed between shoulders 9, as shown in the side view of hinge 5 depicted in FIG. 3, gaps 15 are created on each side of knuckle 7 between knuckle 7 and each of shoulders 9. While the gaps on each side of knuckle 7 need not have the same size, for simplicity's sake, the foregoing description will assume that gaps 15 are equal in size. Accordingly, each gap 15 has a size G defined by:

$$G=(D-W)/2.$$

Specifically, each gap has a size G which is equal to the width W of knuckle 7 subtracted from the distance D between shoulders 9, divided by two (since there are two gaps).

Friction washers 8, each of which is compressed to fit into a respective one of gaps 15, are made from a compressible elastic material, such as rubber or a thermoplastic elastomer, which has a relatively high coefficient of friction. In an uncompressed state, each of friction washers 8 has a thickness T, as shown in FIG. 2. As was the case with respect to gaps 15, each friction washer need not have the same thickness, but for the sake of simplicity, the following description assumes that each friction washer 8 has a same thickness T.

The thickness T of each of friction washers 8, i.e., the thickness of friction washers 8 in an uncompressed state, is greater than the size G of each of gaps 15. Thus, in an uncompressed state, friction washers 8 do not fit into gaps 15. However, because friction washers 8 are made from a compressible elastic material, such as rubber, friction washers 8 can be compressed to less than the size G of gaps 15 in order to fit into gaps 15, as shown in FIG. 3. By compressing friction washers 8 to fit into gaps 15, an interference fit is created among friction washers 8, knuckle 7 and shoulders 9. This interference fit causes a frictional force to be created among friction washers 8, knuckle 7 and shoulders 9, which permits controlled angular motion of display screen 3 with respect to keyboard base 4, as described below.

As noted above, gaps 15 need not be the same size, and friction washers 8 also need not be the same size. In a case where gaps 15 and/or friction washers 8 are not the same size, an interference fit can still be obtained so long as each friction washer, in an uncompressed state, has a thickness which is greater than a size of a respective gap into which the friction washer is to be fit.

Each of friction washers 8 also has a throughbore which, when friction washers 8 are fit into gaps 15, is aligned with the throughbores of shoulders 9 and the throughbore of knuckle 7. Pin 10, shown in FIG. 3, slidably fits into the throughbores of friction washers 8, shoulders 9 and knuckle 7, to join these components of hinge 5. Pin 10, in addition to joining the components of hinge 5, acts as a pivoting axis for hinge 5. That is, display screen 3 pivots with respect to keyboard base 4 around pin 10. It is noted that while, in a preferred embodiment, pin 10 is a separate component, pin 10 can be a part of another component, such as shoulders 9.

It is further noted that while the present embodiment is described using two friction washers, one on each side of knuckle 7, the present invention can be implemented as well using only one friction washer on either side of knuckle 7.

As noted above, hinge 5 controls angular motion of display screen 3 via a frictional force created by an interference fit among friction washers 8, knuckle 7 and shoulders 9, all of which are held in place by pin 10. In this regard, since knuckle 7 and shoulders 9 have a rounded shape, knuckle 7 and shoulders 9 permit display screen 3 to move with respect to keyboard base 4 over a wide range of angles, from 0° to greater than 180°. Accordingly, in a preferred embodiment of the present invention, the frictional force created by the interference fit is sufficient to control the angular motion of display screen 3 even over such a wide range of angles.

In addition, in a preferred embodiment, the frictional force created by the interference fit is such that display screen 3 can be maintained at any angle with respect to keyboard base 4 absent any other applied force, regardless of the mass of, and torque created by, display screen 3. Moreover, in preferred embodiments of the present invention, the frictional force is such that during opening and closing, display screen 3 does not slam into keyboard base 4.

In this regard, the frictional force created by a single hinge, such as hinge 5, can be varied by modifying the interference fit among knuckle 7, shoulders 9 and friction washers 8. This can be done by varying parameters of hinge 5, such as the thickness T of friction washers 8 and/or the size G of gaps 15. More specifically, if a greater frictional force is desired, the thickness T of friction washers 8 can be increased relative to the size G of gaps 15. Size G of gaps 15 can be varied by varying the fixed distance D between shoulders 9, or the width W of knuckle 7. On the other hand, if a smaller frictional force is desired, then the size G of gaps 15 can be increased relative to the thickness T of friction washers 8.

Variations in washer hardness, washer area and washer coefficient of friction will also vary the frictional force created by the interference fit. Likewise, varying the coefficient of friction of shoulders 9 and/or knuckle 7 will vary the frictional force.

The overall frictional force between display screen 3 and keyboard base 4 can be varied by varying the number of hinges used to attach display screen 3 to keyboard base 4, and by varying the clearance between display screen 3 and keyboard base 4. In this regard, the clearance between display screen 3 and keyboard base 4 can be varied, for example, by varying the height H of shoulders 9 and by correspondingly varying the radius R of knuckle 7, as shown in FIG. 2.

Figure 4:
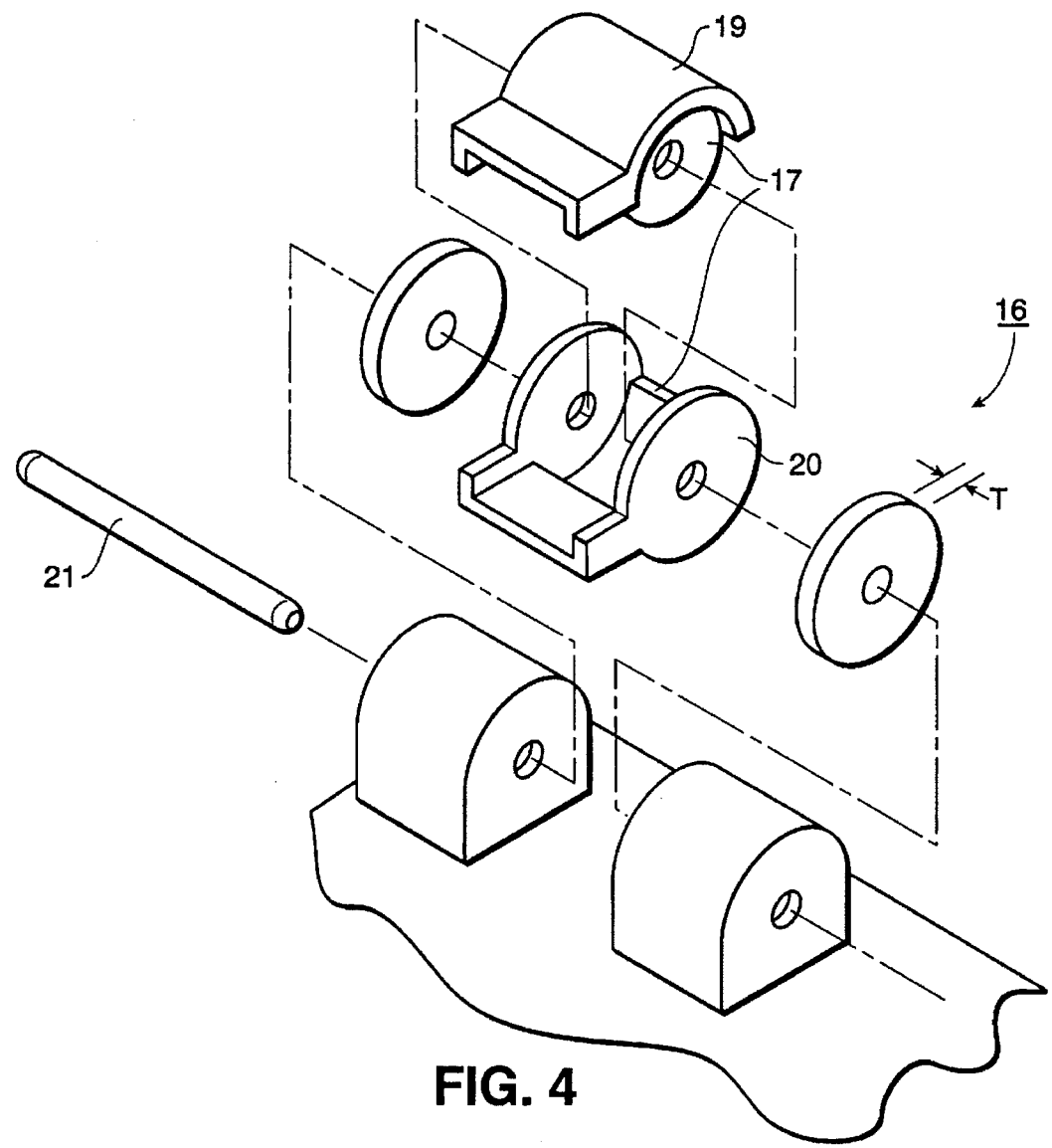
FIG. 4.shows a perspective view of a friction hinge according to a first modification to the first embodiment of the present invention.

FIG. 4 shows hinge 16, which is a first modification to the first embodiment of the present invention. In FIG. 4, knuckle 17 is comprised of two halves, upper portion 19 and lower portion 20. The remaining features of the invention are the same as those described above with respect to FIGS. 2 and 3. Accordingly, a detailed description thereof is omitted here for the sake of brevity.

In this first modification, upper portion 19 and lower portion 20 mate to form knuckle 17. Conventionally, this mating is performed prior to assembly of knuckle 17. However, in this modification to the first embodiment, upper portion 19 and lower portion 20 are mated during assembly of hinge 16, such that a throughbore of upper portion 19 aligns to a throughbore of lower portion 20. In this case, pin 21, which slidably fits through knuckle 17, fits through the throughbores of upper portion 19 and lower portion 20. In this manner, pin 21 fastens upper portion 19 to lower portion 20, thereby holding together knuckle 17, in addition to holding together hinge 16.

Figure 5:
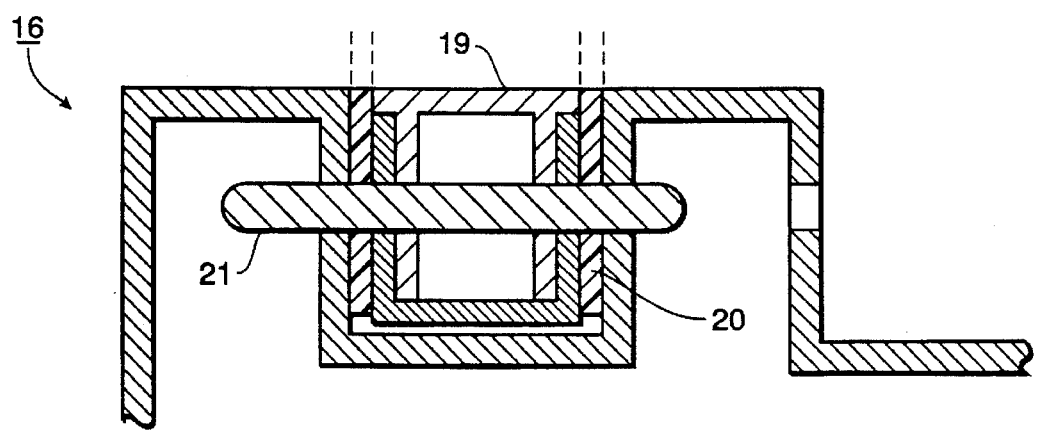
FIG. 5 shows a cross-sectional side view of the friction hinge according to the first modification to the first embodiment of the present invention.

FIG. 5 shows a side view of upper portion 19 mated to lower portion 20 and joined along with the remaining components of hinge 16 by pin 21.

Figure 6:
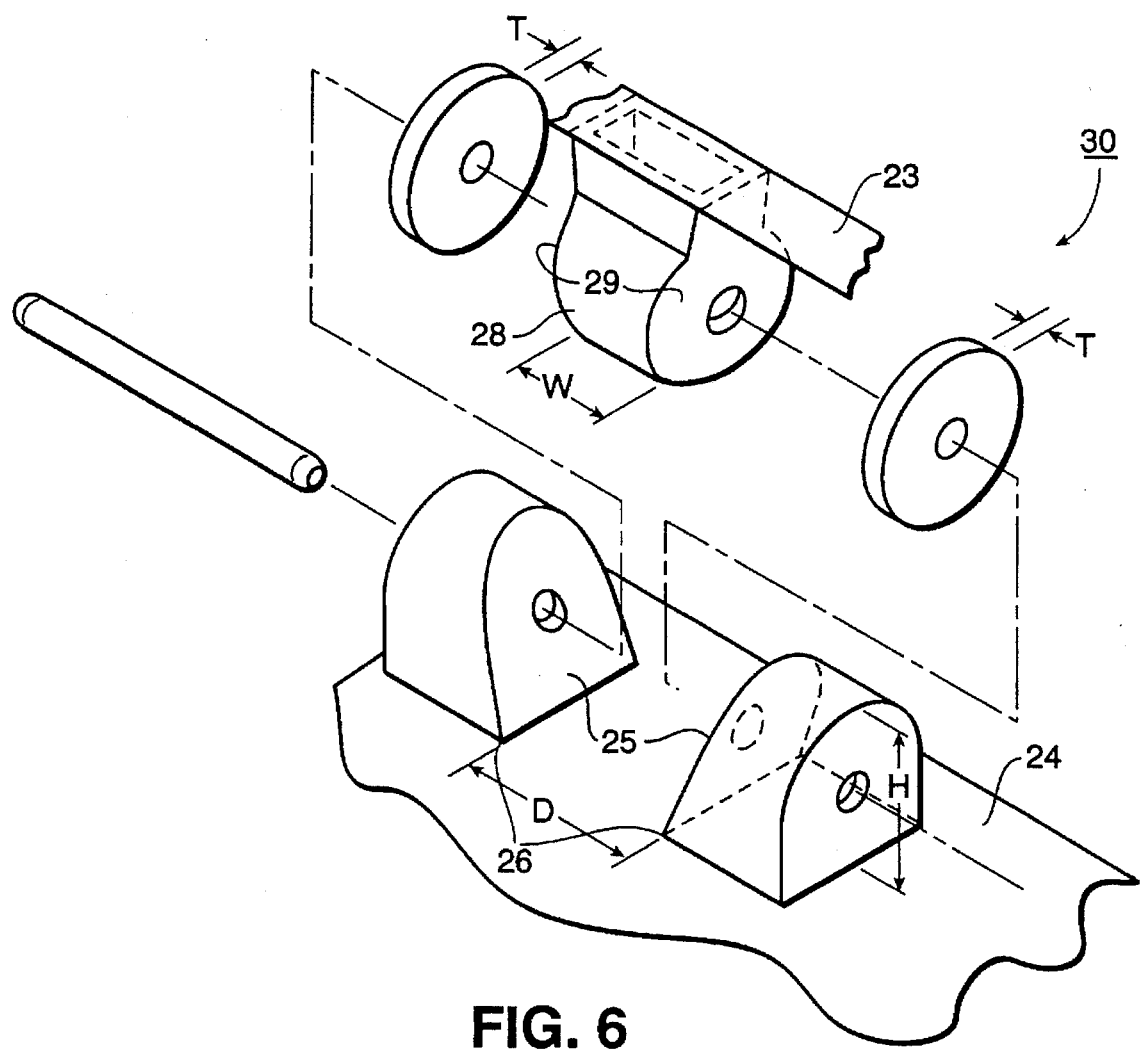
FIG. 6 shows a perspective view of a friction hinge according to a second modification to the first embodiment of the present invention.
Figure 7:
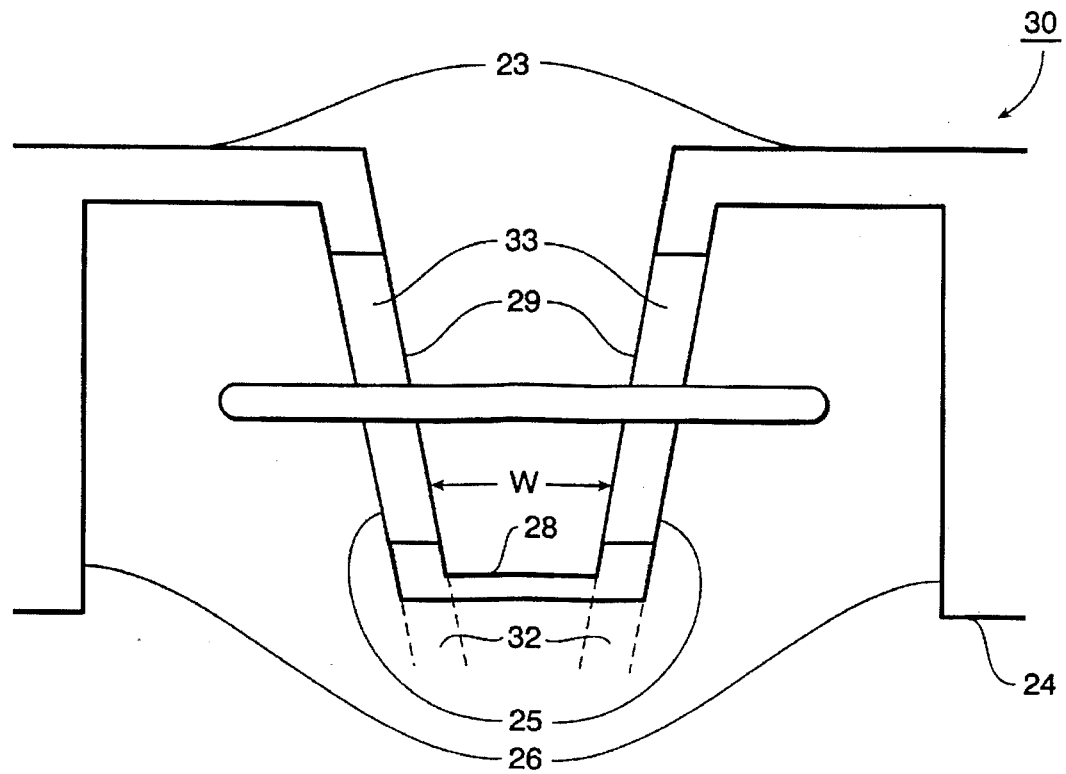
FIG. 7 shows a cross-sectional side view of the friction hinge according to the second modification to the first embodiment, in which a display screen is at a 90° angle with respect to a keyboard base.
Figure 8:
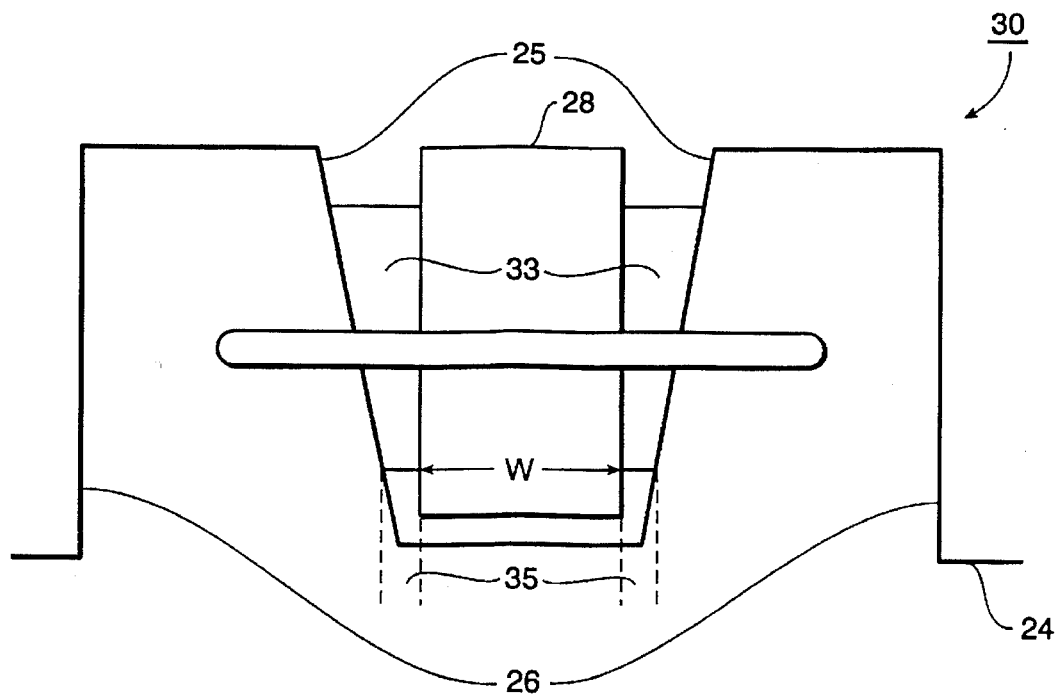
FIG. 8 shows a cross-sectional side view of the friction hinge according to the second modification to the first embodiment, in which the display screen is at either a 0° or a 180° angle with respect to the keyboard base.

FIGS. 6 to 8 show a second modification to the first embodiment of the present invention. According to this second modification, the frictional force created by the interference fit varies as the rotational angle of display screen 23 varies with respect to keyboard base 24. Features shown in FIGS. 6 to 8 which are identical in both structure and function to those shown in FIGS. 2 and 3 are labelled similarly. A detailed description of such features will not be repeated.

In the second modification, shown in FIG. 6, surfaces 25 of shoulders 26 taper outwardly, away from knuckle 28, while knuckle 28 has a varying width W which progressively decreases in a direction away from display screen 23. As shown, surfaces 25 of shoulders 26 are angled away from each other such that a distance between surfaces 25 is at a minimum at keyboard base 24, and surfaces 29 of knuckle 28 are angled toward each other such that a distance between surfaces 29 is at a maximum at display screen 23. As a result, gaps created by shoulders 26 and knuckle 28 vary as knuckle 28 rotates with respect to shoulders 26. Friction washers disposed in those gaps deform accordingly, thereby varying the amount of frictional force generated.

More specifically, according to this modification, the gaps have a substantially constant maximum thickness in a case where keyboard base 24 is at a 90° angle to display screen 23. However, as display screen 23 is rotated away from 90°, i.e., towards 0° or 180°, areas of the gaps decrease in size such that those areas are at a minimum size in a case where display screen 23 is at either a 0° angle or a 180° angle to keyboard base 24. This feature is shown in FIGS. 7 and 8, described below.

FIG. 7 shows a side view of hinge 30 according to the second modification, in a case where display screen 23 is angled at 90° with respect to keyboard base 24. As shown in FIG. 7, surfaces 25 of shoulders 26 taper outwardly, whereas width W of knuckle 28 progressively decreases away from display screen 23. As shown, in this configuration, gaps 32 are at a substantially constant maximum size at 90°. As a result, the frictional force created by the interference fit among friction washers 33, shoulders 26 and knuckle 28 is at an overall minimum.

FIG. 8 shows a side view of hinge 30 according to the second modification, in a case where display screen 23 (not shown) is angled at either 0° or 180° with respect to keyboard base 24. As shown in FIG. 8, since knuckle 28 is rotated with respect to shoulders 26, knuckle 28 and surfaces 25 of shoulders 26 no longer correspond to create a constant gap. Rather, as shown in FIG. 8, knuckle 28 rotates such that a portion of knuckle 28 having a substantially maximum width W, i.e., that portion of knuckle 28 which is closest to display screen 23, is now disposed between shoulders 26. This portion of knuckle 28 interacts with shoulders 26 so as to produce minimum gaps 35. As a result, friction washers 33 are further compressed, and the frictional force created by the interference fit among friction washers 33, shoulders 26 and knuckle 28 is increased.

Thus, by virtue of the foregoing, a maximum frictional force is created in a case where display screen 23 is at either 0° or 180° to keyboard base 24, whereas a minimum frictional force is created in a case where display screen 23 is at 90° to keyboard base 24. This additional frictional force is desirable as display screen 23 approaches either 0° or 180°, due to the increased torque on display screen 23 as display screen 23 approaches these angles.

It is noted that the first and second modifications to the first embodiment can also be combined in one hinge, for example, in a case where knuckle 28, shown in FIG. 6, is comprised of upper and lower portions. Such a hinge would include all of the features and advantages described above. Accordingly, a detailed description thereof is omitted for the sake of brevity.

Second Embodiment

Figure 9:
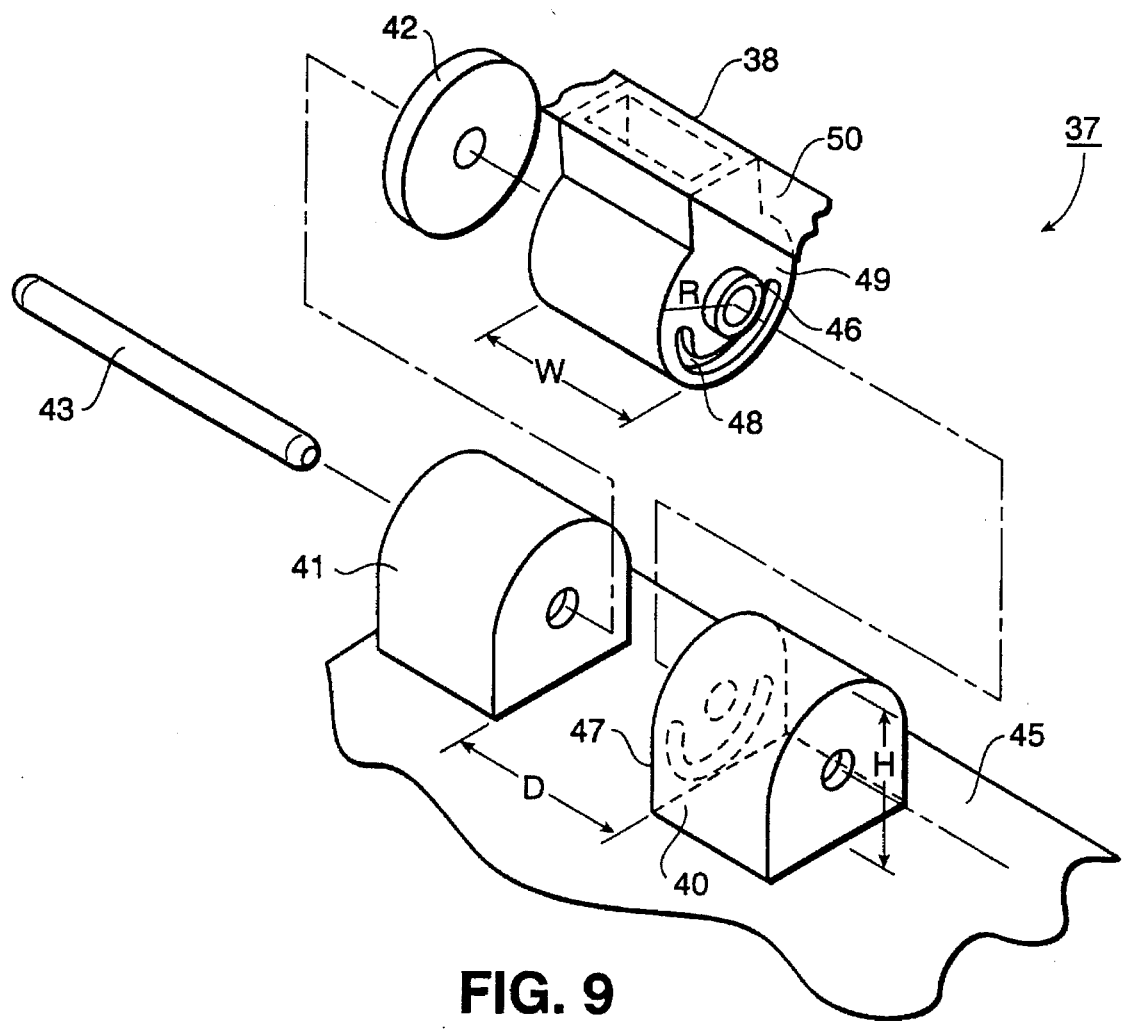
FIG. 9 shows a left-perspective view of a friction hinge according to a second embodiment of the present invention.
Figure 10:
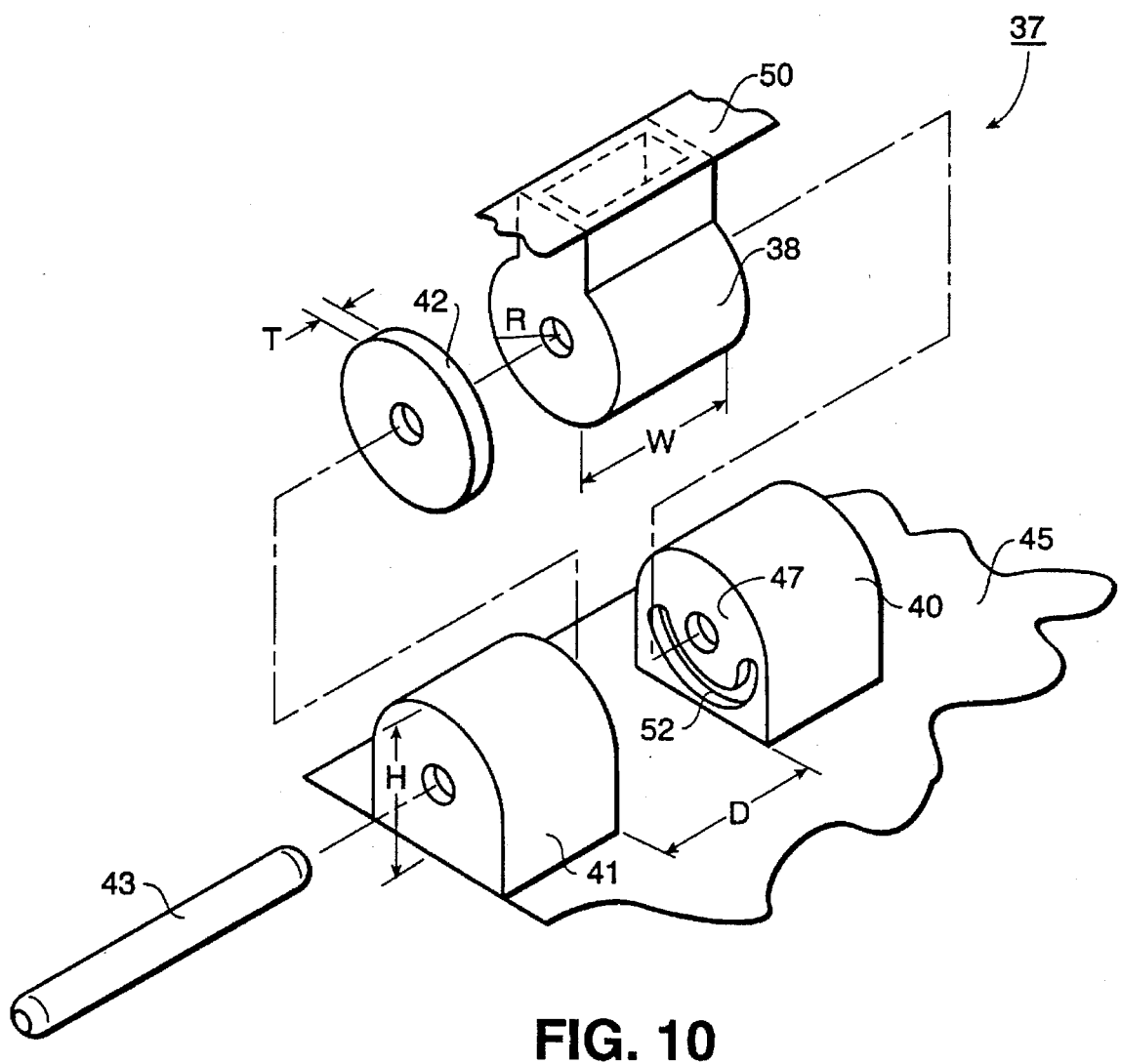
FIG. 10 shows a right-perspective view of the friction hinge according to the second embodiment of the present invention.

FIGS. 9 and 10 show left and right perspective views, respectively, of hinge 37, which is a second embodiment of the present invention. In the second embodiment, descriptions of features which are the same as those of the first embodiment are omitted for the sake of brevity.

As shown in FIGS. 9 and 10, hinge 37 includes knuckle 38, first shoulder 40, second shoulder 41, friction washer 42 and pin 43. Each of these features is described in more detail below. In this regard, except for the differences described below, the foregoing features are identical to those described above with respect to the first embodiment.

As was the case with respect to the first embodiment, first shoulder 40 and second shoulder 41 are separated on keyboard base 45 by a fixed distance D, into which knuckle 38 having width W is disposed. In the second embodiment, however, knuckle 38 includes protrusion 46 on surface 49 thereof, as shown in FIG. 9. Protrusion 46 is preferably cylindrically-shaped, has a flat surface which corresponds to a flat surface of surface 47 of first shoulder 40, and includes a throughbore which aligns to a throughbore of first shoulder 40. Knuckle 38 also includes channel 48 which runs from surface 49 of knuckle 38 through to display screen 50. As shown in FIG. 10, first shoulder 40 further includes channel 52, which corresponds to channel 48 on knuckle 38. Channel 52 runs from surface 47 of first shoulder 40 to keyboard base 45.

Figure 11:
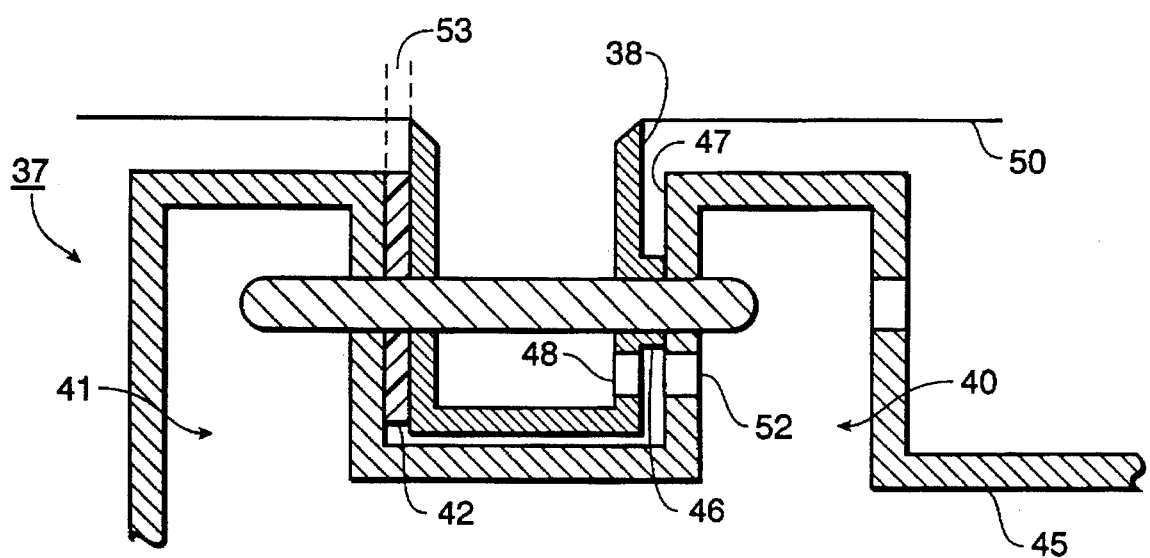
FIG. 11 shows a cross-sectional side view of the friction hinge according to the second embodiment of the present invention.

In this embodiment, when hinge 37 is assembled, as shown in FIG. 11's side view, and knuckle 38 is disposed between first shoulder 40 and second shoulder 41, protrusion 46 abuts surface 47 of first shoulder 40, such that no gap is created between protrusion 46 and first shoulder 40. However, a gap, gap 53 (shown in FIG. 11), is created between second shoulder 41 and the side of knuckle 38 which does not include protrusion 46. Into this gap is fit friction washer 42.

As was the case with respect to the first embodiment, friction washer 42, in an uncompressed state, has a thickness greater than the size of gap 53. Accordingly, friction washer 42 is compressed to fit into gap 53, thereby creating an interference fit among second shoulder 41, friction washer 42 and knuckle 38. This interference fit results in a frictional force which permits controlled angular motion of display screen 50 with respect to keyboard base 45.

As shown in FIG. 11, channel 48 of knuckle 38 and channel 52 of first shoulder 40 align so as to create a continuous channel from keyboard base 45 through to display screen 50. Through this continuous channel wires and the like can be run between keyboard base 45 and display screen 50.

Since, as noted, one of the purposes of creating the continuous channel is to run wires between keyboard base 45 and display screen 50, both channel 48 of knuckle 38 and channel 52 of first shoulder 40 are shaped so that portions thereof overlap throughout an entire range of angular motion of display screen 50 with respect to keyboard base 45.

In this regard, in preferred embodiments, as shown in FIGS. 9 and 10, a "U" shaped channel on both first shoulder 40 and knuckle 38 is used to ensure that a continuous channel runs from keyboard base 45 to display screen 50.

Figure 12:
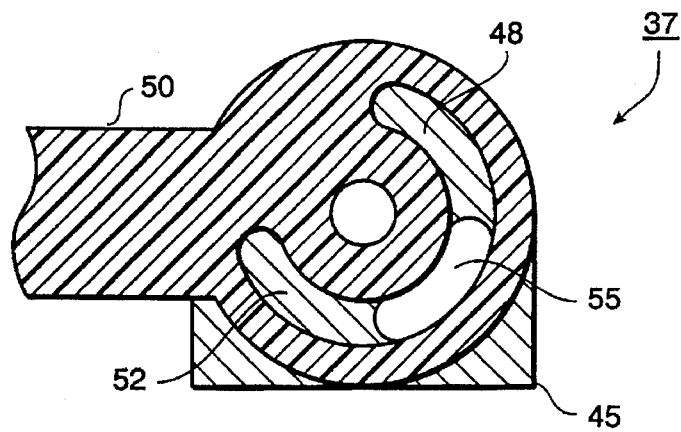
FIG. 12 shows, in a friction hinge according to the second embodiment, alignment of throughbores for a knuckle and a shoulder in a case where a display screen is at a 0° angle with respect to a keyboard base.
Figure 13:
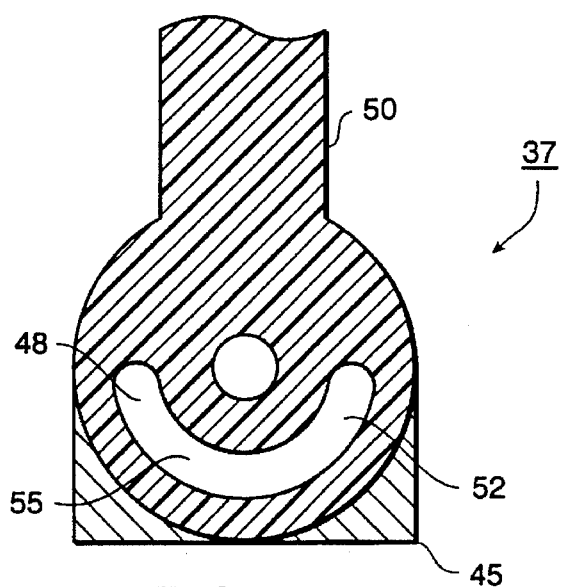
FIG. 13 shows, in the friction hinge according to the second embodiment, alignment of throughbores for the knuckle and the shoulder in a case where the display screen is at a 90° angle with respect to the keyboard base.
Figure 14:
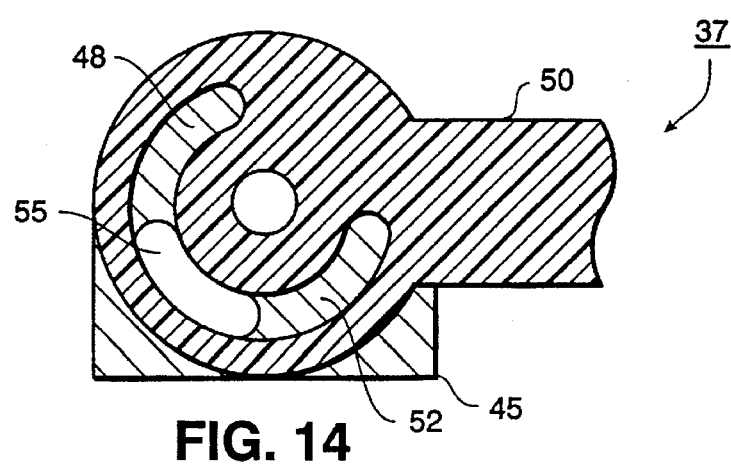
FIG. 14 shows, in the friction hinge according to the second embodiment, alignment of throughbores for the knuckle and the shoulder in a case where the display screen is at a 180° angle with respect to the keyboard base.

FIGS. 12 to 14 show continuous channel 55, which results from correspondence of channel 48 of knuckle 38 and channel 52 of first shoulder 40 throughout an entire range of angular motion of display screen 50 with respect to keyboard base 45. More specifically, FIG. 12 shows keyboard base 45 at a 0° angle with respect to display screen 50; FIG. 13 shows keyboard base 45 at a 90° angle with respect to display screen 50; and FIG. 14 shows keyboard base 45 at a 180° angle with respect to display screen 50. As noted above, throughout this entire range of motion, continuous channel 55 is present.

Figure 15:
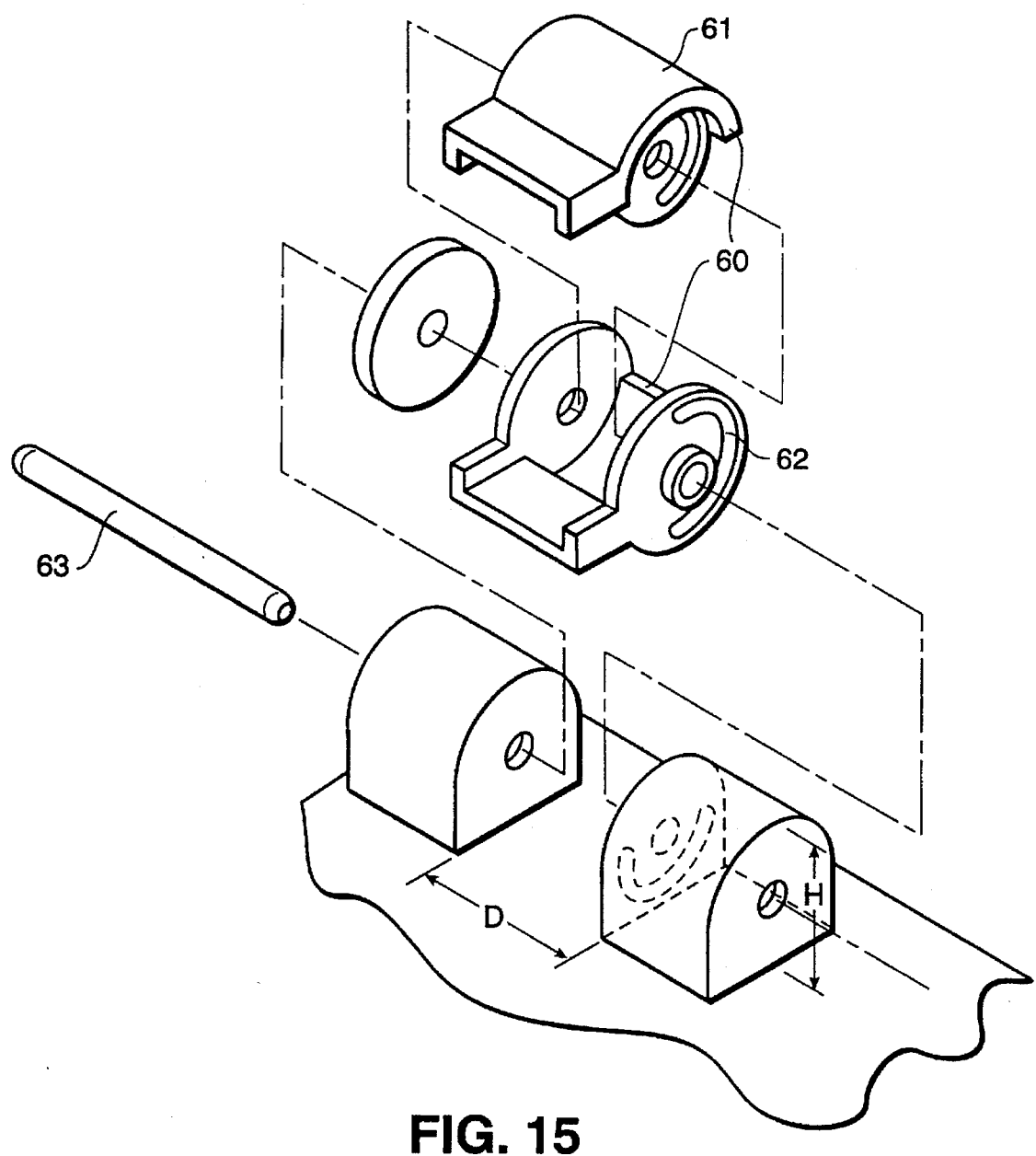
FIG. 15 shows a perspective view of a first modification to the second embodiment of the present invention.

In a first modification to the second embodiment, shown in FIG. 15, knuckle 60 is comprised of upper portion 61 and lower portion 62, which are held together via pin 63. As was the case with respect to the first embodiment, upper portion 61 and lower portion 62 are mated to form knuckle 60. Accordingly, this first modification to the second embodiment includes all of the features and advantages of the first modification to the first embodiment in addition to those of the second embodiment. A detailed description thereof is omitted for the sake of brevity.

Figure 16:
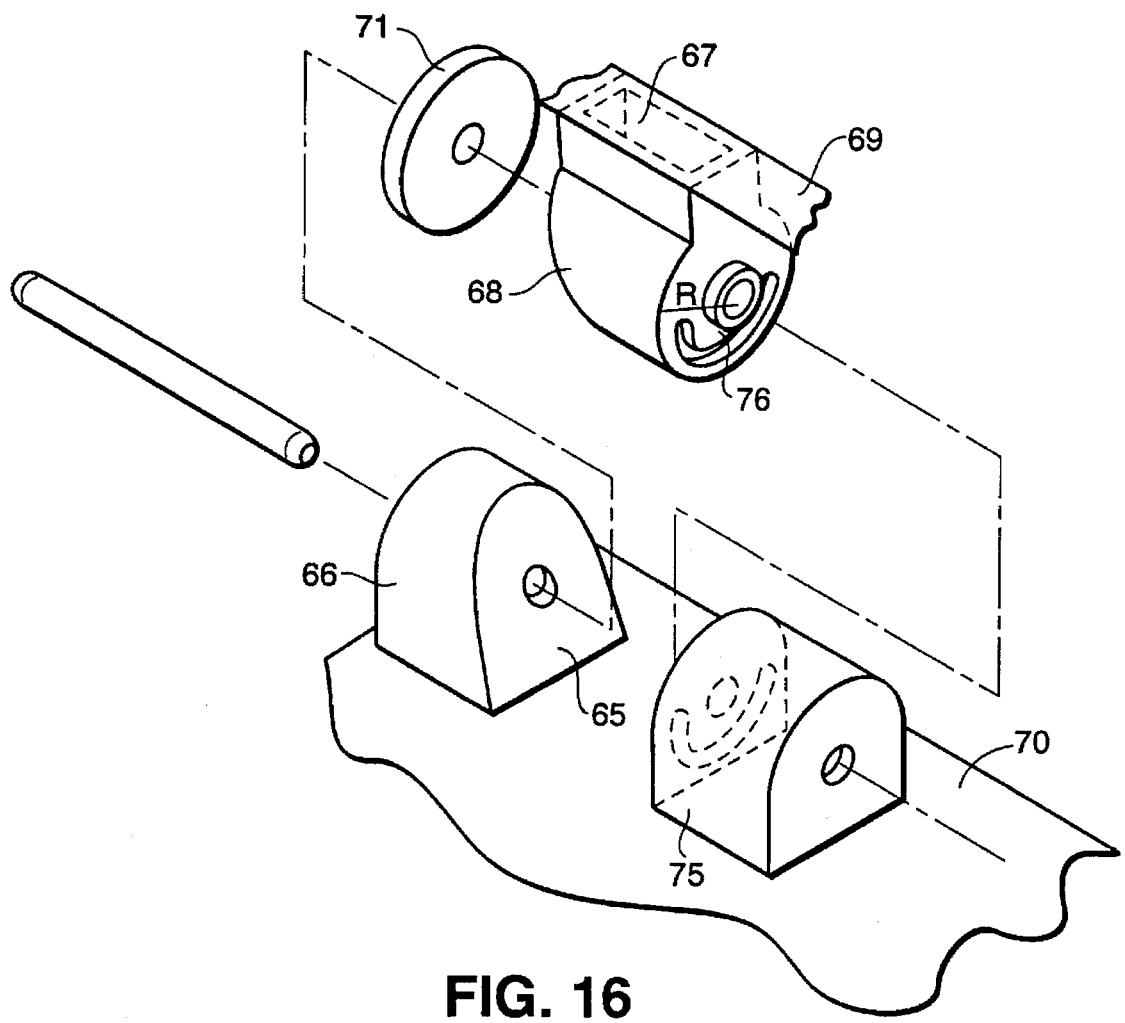
FIG. 16 shows a perspective view of a second modification to the second embodiment of the present invention.

In a second modification to the second embodiment, shown in FIG. 16, surface 65 of second shoulder 66 tapers outwardly, away from knuckle 67, while surface 68 of knuckle 67 tapers away from surface 65 of second shoulder 66 the further surface 68 gets away from display screen 69. As shown, surface 65 of second shoulder 66 is angled away from first shoulder 75 such that a distance between surface 65 and first shoulder 75 is at a minimum at keyboard base 70, and surface 68 of knuckle 67 is angled toward surface 76 of knuckle 67 such that a distance between surface 68 and surface 76 is at a maximum at display screen 69. In this modification to the second embodiment, first shoulder 75 and surface 76 of knuckle 67 remain perpendicular to keyboard base 70, and include all of the features and advantages of the second embodiment, shown in FIGS. 9 and 10. Accordingly, a detailed description thereof is omitted.

As was the case with respect to the second modification to the first embodiment described above, when display screen 69 is at 90° with respect to keyboard base 70, the frictional force created by an interference fit of friction washer 71 between second shoulder 66 and knuckle 67 is at a minimum. However, as display screen 69 moves away from this 90° angle, the frictional force increases, reaching a maximum at 0° and 180°. This process is identical to that described with respect to FIGS. 6 to 8. Accordingly, a detailed description thereof is omitted for the sake of brevity.

It is noted that the first and second modifications to the second embodiment can be combined in one hinge, for example, in a case where knuckle 67, shown in FIG. 16, is comprised of upper and lower portions. Such a hinge would include all of the features and advantages described above. Accordingly, a detailed description thereof is omitted for the sake of brevity.

It is also noted that, while the foregoing embodiments describe using only one friction washer per gap, more than one friction washer can be used in each gap, depending upon the size of the gap and the amount of frictional force desired.

Finally, while the various embodiments and modifications thereto of the present invention have been described with respect to a display screen and a keyboard for a laptop computer, the hinge of the present invention can be used in a variety of settings, and is not limited to use in a laptop computer. For example, any embodiment of the present hinge can be used to attach any two members, such as a lid of a box and a base.

In this regard, the present invention has been described with respect to a particular illustrative embodiment. It is to be understood that the invention is not limited to the above-described embodiments and modifications thereto, and that various changes and modifications may be made by those of ordinary skill in the art without departing from the spirit and scope of the appended claims.

What is claimed is:

1. A hinge for fastening a display screen to a keyboard base, said hinge using frictional force generated by one or more compressed friction washers to control angular motion of the display screen with respect to the keyboard base, said hinge comprising:

two shoulders defining inwardly-facing flat abutment surfaces separated by a first distance, said two shoulders being disposed on the keyboard base;

a knuckle having a pair of outwardly-facing flat abutment surfaces separated by a second distance which is less than the first distance, said knuckle being disposed on the display screen;

at least one compressible friction washer, disposed between said knuckle and said two shoulders, and having a thickness which is greater than a difference between the first distance and the second distance, but which is compressible to less than the difference, each of said two shoulders, said knuckle, and said at least one compressible friction washer having alignable throughbores; and a pin, which fits through the alignable throughbores of said two shoulders, said knuckle, and said at least one compressible friction washer.

2. A hinge according to claim 1, wherein the inwardly-facing flat abutment surfaces of said two shoulders are angled away from each other such that a distance between the inwardly-facing flat abutment surfaces is at a minimum at the keyboard base; and wherein the pair of outwardly-facing flat abutment surfaces of said knuckle are angled toward each other such that a distance between the outwardly-facing flat abutment surfaces is at a maximum at the display screen.

3. A hinge according to claim 2, wherein the inwardly-facing flat abutment surfaces of said two shoulders and the pair of outwardly-facing flat abutment surfaces of said knuckle engage said at least one friction washer so that (1) a minimum frictional force is created when the display screen is angled at 90° with respect to the keyboard base, and (2) a maximum frictional force is created when the display screen is angled at either 0° or 180° with respect to the keyboard base.

4. A hinge according to claim 1, wherein said knuckle is comprised of an upper portion and a lower portion, the upper portion and the lower portion having alignable throughbores;

wherein the upper portion of said knuckle is mated to the lower portion of said knuckle such that the throughbore of the upper portion is aligned to the throughbore of the lower portion; and wherein said pin is run through the throughbore of the upper portion and the throughbore of the lower portion.

5. A hinge according to claim 4, wherein the inwardly-facing flat abutment surfaces of said two shoulders are angled away from each other such that a distance between the inwardly-facing flat abutment surfaces is at a minimum at the keyboard base; and wherein the pair of outwardly-facing flat abutment surfaces of said knuckle are angled toward each other such that a distance between the outwardly-facing flat abutment surfaces is at a maximum at the display screen.

6. A hinge according to claim 1, wherein said knuckle has a rounded shape and a each of said two shoulders has a rounded shape, such that the display screen can move from 0° to greater than 180° with respect to the keyboard base.

7. A hinge according to claim 1, wherein said knuckle and said two shoulders are made from materials which produce a coefficient of friction between said two friction washers and said two shoulders, and between said two friction washers and said knuckle which is sufficient to permit the display screen to be maintained at a set angle with respect to the keyboard base absent an applied force.

8. A hinge according to claim 1, wherein said two shoulders comprise a first shoulder and a second shoulder, the first shoulder having a channel which runs from the keyboard base to an inwardly-facing flat abutment surface of the first shoulder;

wherein an outwardly-facing flat abutment surface of said knuckle which faces the first shoulder includes a channel which runs through to the display screen; and wherein the channel of the first shoulder and the channel of said knuckle are aligned so that a continuous channel runs between the keyboard base and the display screen throughout an entire range of angular motion of the display screen with respect to the keyboard base.

9. A hinge according to claim 8, wherein wires are run between the display screen and the keyboard base through the continuous channel.

10. A hinge according to claim 1, wherein said hinge comprises two friction washers, each of which is disposed on either side of said knuckle between the outwardly-facing abutment surfaces of said knuckle and the inwardly-facing abutment surfaces of said shoulders.

11. A hinge according to claim 10, wherein the outwardly-facing abutment surfaces of said knuckle each includes a recess, into which is fit one of the two friction washers; and wherein the recess has a shape which corresponds to a shape of the two friction washers, and has a depth which permits said two friction washers to be compressed between the outwardly-facing abutment surfaces of said knuckle and the inwardly-facing abutment surfaces of said shoulders.

12. A hinge for fastening a display screen to a keyboard base which uses a frictional force to permit controlled angular motion of the display screen with respect to the keyboard base, and to maintain the display screen at a set angle with respect to the keyboard base, said hinge comprising:

two shoulders disposed on the keyboard base with a fixed distance therebetween;

a knuckle, disposed on the display screen and protruding therefrom, having a width which is smaller than the fixed distance, and positioned between said two shoulders such that a gap exists on each side of said knuckle between said knuckle and each of said two shoulders;

two friction washers made of a compressible elastic material, each of said two friction washers (1) having a thickness, in an uncompressed state, which is greater than that of the gaps between said knuckle and said two shoulders, and (2) being compressed to fit into one of the gaps between said knuckle and a shoulder, each of said two shoulders, said knuckle, and said two friction washers having throughbores which are alignable; and a pin which connects said two shoulders, said knuckle, and said two friction washers through their respective throughbores.

13. A hinge according to claim 12, wherein a surface of each of said two shoulders which faces said knuckle tapers away from said knuckle; and wherein said knuckle has a width which progressively decreases in a direction away from the display screen such that (1) the gaps between said knuckle and said two shoulders have a substantially constant size in a case where the keyboard base is at a 90° angle to the display screen, and (2) areas of the gaps between said knuckle and said two shoulders are at a minimum size in a case where the keyboard base is at either a 0° angle or a 180° angle to the display screen.

14. A hinge according to claim 12, wherein said knuckle is comprised of an upper portion having a throughbore and a lower portion having a throughbore;

wherein the upper portion of said knuckle is mated to the lower portion of said knuckle so as to align the throughbore of the upper portion of said knuckle to the throughbore of the lower portion of said knuckle; and wherein said pin is run through both the throughbore of the upper portion of said knuckle and the throughbore of the lower portion of said knuckle when the upper portion of said knuckle is mated to the lower portion of said knuckle.

15. A hinge according to claim 14, wherein a surface of each of said two shoulders which faces said knuckle tapers away from said knuckle; and wherein said knuckle has a width which progressively decreases in a direction away from the display screen such that (1) the gaps between said knuckle and said two shoulders have a substantially constant size in a case where the keyboard base is at a 90° angle to the display screen, and (2) areas of the gaps between said knuckle and said two shoulders are at a minimum size in a case where the keyboard base is at one of a 0° angle and a 180° angle to the display screen.

16. A hinge according to claim 12, wherein said knuckle and said two shoulders are made from materials which produce a coefficient of friction between said two friction washers and said two shoulders, and between said two friction washers and said knuckle which is sufficient to permit the display screen to be maintained at a set angle with respect to the keyboard base absent an applied force.

17. A hinge for fastening a display screen to a keyboard base which uses a frictional force to permit controlled angular motion of the display screen with respect to the keyboard base, and to maintain the display screen at a set angle with respect to the keyboard base, said hinge comprising:

two shoulders disposed on the keyboard base with a fixed distance therebetween;

a knuckle, disposed on the display screen and protruding from the display screen, having a width smaller than the fixed distance, positioned between said two shoulders such that said knuckle faces a first of said two shoulders and such that a gap exists between said knuckle and a second of said two shoulders, said knuckle having a throughbore;

a friction washer made of a compressible elastic material, which (1) has a thickness, in an uncompressed state, which is greater than that of the gap between the second shoulder and said knuckle, and (2) is compressed to fit into the gap between the second shoulder and said knuckle, said two shoulders, said knuckle and said friction washer having throughbores which are alignable; and a pin which connects said two shoulders, said knuckle and said friction washer through their respective throughbores;

wherein the first shoulder includes a channel which runs through to the keyboard base, and said knuckle, on a surface which faces the first shoulder, includes a channel which runs through to the display screen and which aligns to the channel on the first shoulder such that a continuous channel runs from the keyboard base to the display screen.

18. A hinge according to claim 17, wherein a surface of the second shoulder which faces said knuckle tapers away from said knuckle; and wherein said knuckle, on a surface which faces the second shoulder, progressively tapers away from the second shoulder such that (1) the gap formed between said knuckle and the second shoulder has a substantially constant thickness in a case where the display screen is at a 90° angle to the keyboard base, and (2) an area of the gap formed between said knuckle and the second shoulder is at a minimum thickness in a case where the display screen is at one of a 0° angle and a 180° angle to the keyboard base.

19. A hinge according to claim 17, wherein said knuckle is comprised of an upper portion having a throughbore and a lower portion having a throughbore;

wherein the upper portion of said knuckle is mated to the lower portion of said knuckle so as to align the throughbore of the upper portion of said knuckle to the throughbore of the lower portion of said knuckle; and wherein said pin is run through both the throughbore of the upper portion of said knuckle and the throughbore of the lower portion of said knuckle when the upper portion of said knuckle is mated to the lower portion of said knuckle.

20. A hinge according to claim 19, wherein a surface of the second shoulder which faces said knuckle tapers away from said knuckle; and wherein said knuckle, on a surface which faces the second shoulder, progressively tapers away from the second shoulder such that (1) the gap formed between said knuckle and the second shoulder is at a substantially constant thickness in a case where the display screen is at a 90° angle to the keyboard base, and (2) an area of the gap formed between said knuckle and the second shoulder is at a minimum thickness in a case where the display screen is at one of a 0° angle and a 180° angle to the keyboard base.

21. A hinge according to claim 17, wherein said knuckle and the second shoulder are made from materials which produce a coefficient of friction among said friction washer, the second shoulder and said knuckle which is sufficient to permit the display screen to be maintained at a set angle with respect to the keyboard base absent an applied force.

22. A hinge according to claim 17, wherein wires are run between the keyboard base and the display screen through the continuous channel; and wherein the channel of said knuckle and the channel of the first shoulder are shaped and aligned such that a portion of the continuous channel exists throughout an entire range of motion of the display screen with respect to the keyboard base.

\* \* \* \* \*